July 17, 1956     H. J. KIMMERLE     2,755,142
PNEUMATICALLY ACTUATED MATERIAL HANDLING APPARATUS
Filed April 28, 1953     2 Sheets-Sheet 1
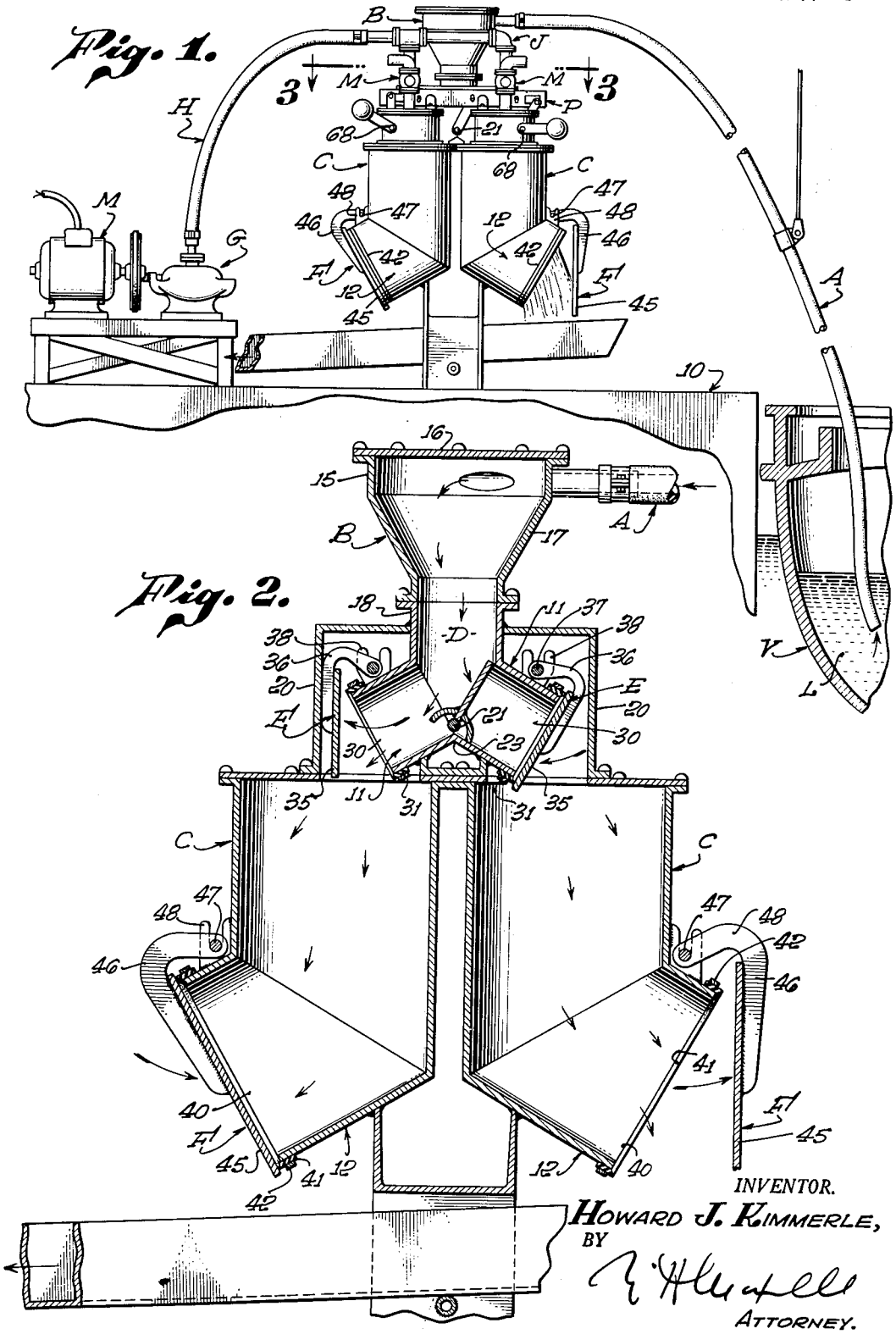
INVENTOR.
HOWARD J. KIMMERLE,
BY
ATTORNEY.

July 17, 1956 H. J. KIMMERLE 2,755,142
PNEUMATICALLY ACTUATED MATERIAL HANDLING APPARATUS
Filed April 28, 1953 2 Sheets-Sheet 2
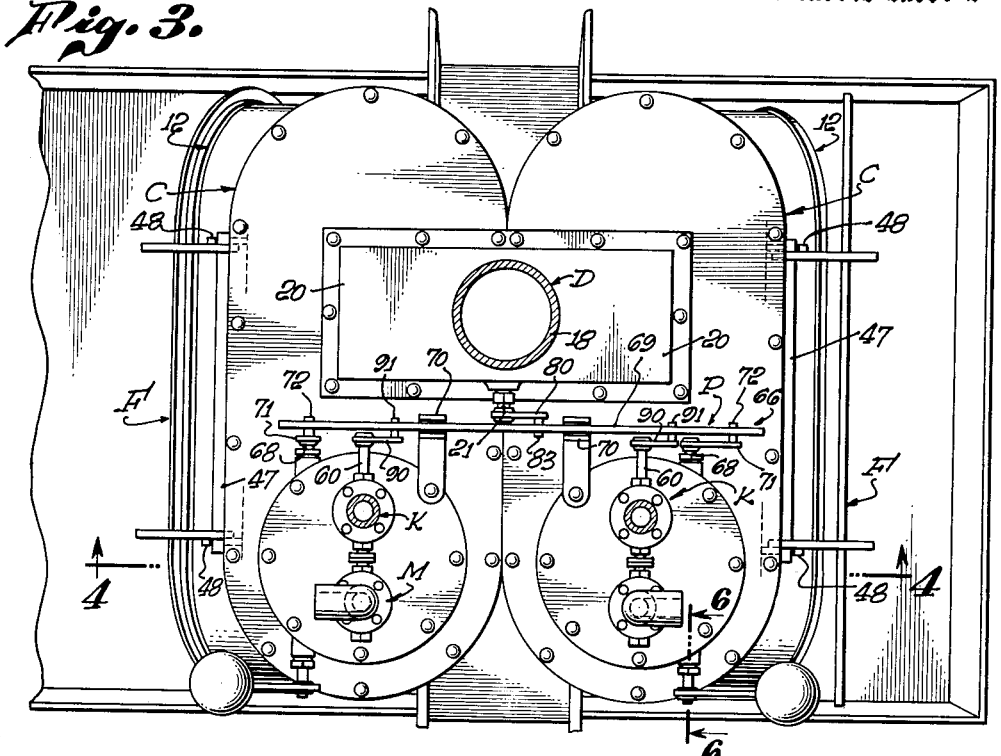
Fig. 3.
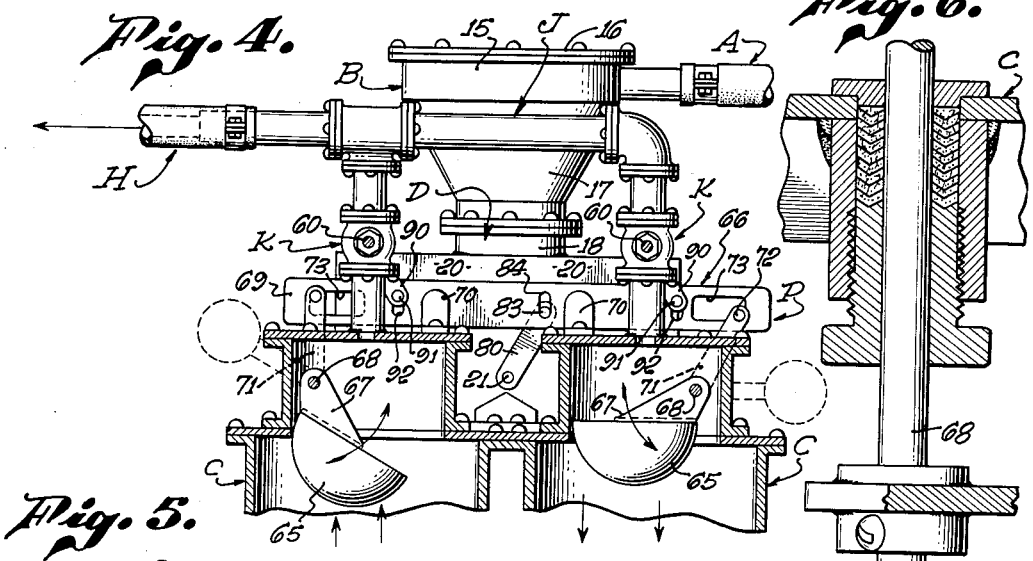
Fig. 4.
Fig. 6.
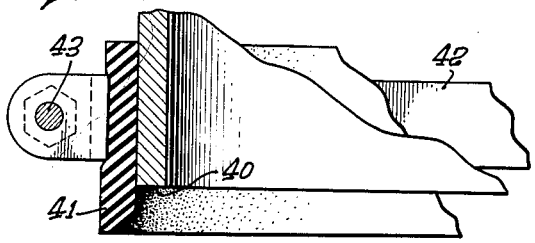
Fig. 5.
INVENTOR.
HOWARD J. KIMMERLE,
BY
ATTORNEY.

United States Patent Office 2,755,142
Patented July 17, 1956

2,755,142

PNEUMATICALLY ACTUATED MATERIAL HANDLING APPARATUS

Howard J. Kimmerle, Los Angeles, Calif.

Application April 28, 1953, Serial No. 351,683

11 Claims. (Cl. 302—28)

This invention has to do with a pneumatically actuated fluid handling apparatus, and it is a general object of the invention to provide a simple, practical improved apparatus of this general character. Various materials or mixtures of materials require handling or movement and where such materials or mixtures are fluid, it is common to employ pumps for the handling thereof. There are certain materials or mixtures of materials, such as fish, wheat, corn and the like, which can not be handled in the manner desired by means of ordinary pumping equipment, and it is a situation of this type to which the apparatus of the present invention is applicable.

The apparatus as provided by the present invention can be used to handle various mixtures or materials that are fluid as, for instance, wheat and corn, however, it is particularly practical for the handling of water bearing fish; for instance, it can be used to advantage for unloading vessels wherein the fish are in a body of water and the apparatus is such as to remove the water and the fish simultaneously and discharges the mixture so that separation occurs after the mixture has been elevated in a desired manner or removed to a desired point.

It is a general object of the present invention to provide apparatus for the handling of a mixture such as water and fish and which is serviceable to maintain a substantially uniform load of such a mixture in a flow line submergible in the mixture and which handles the mixture without damage to or mutilation of the fish contained therein.

It is another object of this invention to provide apparatus of the general character referred to characterized by chests alternately employed to handle the mixture and under control of flapper-type valves.

It is a further object of this invention to provide apparatus of the general character referred to wherein the action or operation of the valves related to the chests is responsive to pressure established in the chests, the action being such that when a reduced or sub-atmospheric pressure is established in a chest, the outlet valve is closed and the inlet valve is opened, whereas when a chest is open to atmospheric pressure, the inlet valve is closed and the outlet valve is open.

It is a further object of this invention to provide apparatus of the general character referred to characterized by various combinations, arrangements and formations of parts serving to provide a mechanism that is simple, practical and effective.

The various objects and features of my invention will be fully understood from the following detailed description of a typical preferred form and application of my invention, throughout which description reference is made to the accompanying drawings, in which:

Fig. 1 is a general view illustrating apparatus of the present invention receiving fluid as from a vessel and delivering it into a trough located, for example, on a dock adjacent the vessel and above the vessel of liquid in the vessel. Fig. 2 is an enlarged detailed sectional view of apparatus as provided by the present invention showing the relationship of the chests included in the construction, the chest at the left being shown in the process of being loaded and that at the right being shown open to discharge. Fig. 3 is an enlarged plane view taken substantially as indicated by line 3—3 on Fig. 1. Fig. 4 is a vertical sectional view taken substantially as indicated by line 4—4 on Fig. 3. Fig. 5 is an enlarged detailed sectional view of the sealing element provided at the seat of one of the valves related to a chest and Fig. 6 is a detailed sectional view at one of the shafts where it enters a chest.

The embodiment of the invention illustrated in the drawings is shown mounted on a platform or support 10 which may, in practice, be a wharf or dock, and the flow line A of the apparatus is shown with its receiving end submerged in a fluid mixture L located in a vessel B adjacent the dock.

The apparatus, as provided by the present invention, includes generally the flow line A, a receiver B supplied by the flow line, flow handling chests C cooperatively related to the receiver and each having an inlet duct 11 at its upper end and an outlet duct 12 at its lower end. A flow directing element D is cooperatively related to the inlet ducts 11 as are inlet valves E while outlet valves F are cooperatively related to the outlet ducts 12. A pneumatic system is provided whereby the chests C are alternately put into service or loaded and then emptied, and this system includes generally an air pump G, an air line H connected with the pump and valve means relating the air line L and the chests and operable to open the chests to atmosphere. In the particular case illustrated, the valve means includes generally a manifold J, air valves K connecting the manifold and the chests and atmospheric valves M connected to the chests and adapted to be open to atmosphere. A control means P governs the action of the deflector D and the valves and is responsive to liquid level in the chests.

The flow line A is preferably a simple, tubular element and is illustrated as a flexible hose-like member of suitable length and having an open receiving end adapted to be submerged in the liquid L as illustrated in Fig. 1 of the drawings.

The receiver B is adapted to be supplied with fluid from or by means of the line A, and in the case illustrated, it is shown as having a cylindrical upper end portion 15 into which the line A connects. A plate 16 closes the upper end of portion 15, and the lower end portion 17 of the receiver extends downwardly from the portion 15 and is downwardly convergent and connects to a depending supply duct 18. In the preferred construction the flow line A connects with the portion 15 tangentially so that fluid flows from line A into the receiver B which circulates or flows smoothly around within the receiver rather than being churned or acting to create turbulence.

The flow handling chests C are like elements arranged side by side and are connected with the supply duct 18 by means of the inlet ducts 11. In the preferred construction, the chests C are elongate elements and are vertically disposed, and in the case illustrated, they are cylindrical in form, that is, they are round in cross-sectional configuration.

The inlet ducts 11 connect the supply duct 18 and the chests C, and in the case illustrated, they are tubular elements with upper ends connected to or open with the lower end of the supply duct 18 and they extend downwardly and outwardly in opposite directions from the lower end of the supply duct 18 and terminate so that their lower ends are above and open to the chests C. In the particular case illustrated, the lower ends of the inlet ducts 11 open into head-like extensions 20 at the upper ends of the chests C.

The flow directing element D is preferably in the form of a baffle carried on a horizontally disposed shaft 21, one end of which projects to the exterior of the structure formed by the ducts 11 and 18. The axis of shaft 21 is located at or close to the point where the lowermost portions of the upper ends of ducts 11 come together as shown in Fig. 2. The baffle forming the element D may be a simple disk-like element carried by shaft 21 so that it can be swung to a closed position relative to either of the inlet ducts 11, as required. In Fig. 2 of the drawings, the baffle D is shown in closed position at the upper end of the inlet duct 11, leaving the inlet duct at the left open and unrestricted. The element D serves strictly as a baffle or flow deflector and is not intended to act as a closure in the nature of a valve making a fluid tight seal.

The inlet valves E are located at and related to the lower ends 30 of the inlet ducts 11, which parts are, in effect, seats that oppose the valves E. In the preferred construction, a sealing member or sealing ring 31 of rubber or rubber-like material is carried at the lower or seat end of each duct 11 and projects somewhat therefrom. The valves E cooperate with and seal against the sealing rings 31 when closed as shown at the right in Fig. 2.

Each inlet valve E is preferably formed so that it has a flat disk-shaped head 35 and an arm 36 extending from the head and carrying a valve shaft 37 rotatably carried in suitable holders 38. In the preferred construction illustrated, the holders 38 are spaced apart so that the arm 36 is received between them and the shaft 37 is horizontally disposed and is located on an axis at the exterior of the duct 11 above the duct 11 and somewhat upstream from the seat end 30 of the duct as clearly shown in Fig. 2 of the drawings. With the construction provided the movable element of the inlet valves, that is, the unit formed by the disk-shaped head 35, the arm 36 and the shaft 37 is carried by the holders 38 so that when it is free and acted upon only by gravity, the head 35 is located close to but slightly spaced from the sealing ring 31 at the seat 30 of the duct 11. As a result of this arrangement, assuming the chest into which the duct 11 opens is at atmospheric pressure, slight reductions of pressure in the duct 11 will cause the valve to close, that is, will cause the head 35 of this seat against the sealing ring 31.

It is notable that with the various constructions just described, the valve heads 35 move bodily away from the seat ends 30 and the sealing rings 31 at the seat ends 20 when the valves open, such open position being illustrated at the left in Fig. 2 of the drawings.

The outlet ducts 12 connect to the lower ends of the chests C and extend downwardly and outwardly therefrom, for instance, they may extend in opposite directions as shown in the drawings and each has an outer or lower end 40 forming, in effect, a seat to receive outlet valve F.

At the lower or seat ends 40 of the outlet ducts 12, the structure preferably includes rubber or rubber-like sealings rings 41 corresponding to the sealing rings 31 at the lower ends of the inlet duct 11. In the case of the sealing rings 41 and the sealing rings 31 retainers 42, in the form of bands held by clamp bolts 43, preferably engage around the sealing rings holding them in place as shown in Fig. 5 of the drawings.

Each outlet valve F preferably includes a flat disk-shaped head 45 and an arm 46 projecting from the head and carrying a valve shaft 47 carried by holders 48. The arm 46 is of such form and extent as to carry the shaft 47 so that it is horizontally disposed and so that its axis is located above the duct 12 at the exterior thereof and upstream from the seat end 40 of the duct so that when the valve hangs freely under the action of gravity, the head 45 is opposite the sealing ring at the seat 40 and is spaced but a short distance therefrom ready to close into engagement with the seat as soon as there is a reduction of pressure in the chest that communicates with the duct. In Fig. 2 of the drawings, the outlet valve F at the left chest is shown closed while that at the right chest is shown open. It is to be noted that when the valves F open they move away from and clear of seat 40 and sealing rings 41, the same as the inlet valves move away from the corresponding parts of the inlet tubes 11.

The pneumatic system as provided by the present invention serves to alternately reduce the pressure occurring in the chests C and is such that when the pressure is reduced in one chest the other chest is open to atmosphere. In the case illustrated, the pneumatic system includes the air pump G, which, in practice, may be driven by a suitable prime mover as, for instance, a motor M. The air line H, shown connected to pump G, has air continuously and constantly exhausted from it, and in the particular case illustrated, the air line H connects to manifold J so that a sub-atmospheric pressure is maintained in the manifold J. The manifold J is connected with the chests C preferably at the upper ends thereof by means of the valves K and the valves K are related through the control means hereinafter described so that when one is open the other is closed. When, for example, the valve for the chamber C at the left is open, a sub-atmospheric pressure is established in that chamber while the valve K for the other chamber, that is, the chamber at the right, is closed. The valves M of the pneumatic system are connected with the chests C, preferably at the upper ends thereof, there being a valve M for each chest C. The valves M are cooperatively related to the valves K, in fact, in the arrangement illustrated, the valves K and M related to a single chest are carried by or coupled to a single valve shaft 60 and the valves are related so that when valve K is open, valve M is closed and vice versa. As a result of this relationship of valves, when the valve K for the chest C at the left is open, the valve M for that chest is closed while at the same time the valve K for the chest at the right is closed while the valve M for that chest is open.

The control means P as provided by the present invention cooperatively relates the flow deflector D and the valves of the pneumatic system and is responsive to fluid in the chests. In the case illustrated, the control means P includes generally control elements 65 in the chests responsive to the level of liquid therein and linkage 66 coupling the elements 65 and the deflector and also the valves.

In the particular case illustrated, there is a control element 65 in or related to each chest and that element is in the nature of a float having an arm 67 carried by a float shaft 68 that projects to the exterior of the chest through a packed joint or connection such as is shown in Fig. 6 of the drawings.

The linkage 66 in the case illustrated is characterized by a shiftable actuator or bar 69 carried by suitable guides 70 so that it is free to reciprocate. In the case illustrated the guides 70 support the bar 69 so that it is movable horizontally. Operating levers 71 are fixed on therein operated by the float shafts 68 and carry pins 72 which operate in slots 73 provided in the bar 69. The levers 71 with the pins 72 thereon are related to the longitudinal slots 73 in the bar 69 so that when the float 65 in the chest at the right is up, the bar 69 is moved to the right as shown in Fig. 4, whereas when the float 65 in the chamber at the left is up, the bar 69 is moved to the left and the float in the chest at the right is down. The action and the relationship of parts is illustrated in Fig. 4 of the drawings.

The linkage 66 further includes a lever 80 on the shaft 21 carrying the deflector B, and the lever 80 carries a pin 83 operating in a slot 84 provided in the bar 69. These parts are related so that when the bar 69 is in the right hand position as shown in Fig. 4, the shaft 21 is rotated so that the baffle D is in the position as shown in Fig. 2 causing flow from the duct 18 to enter the inlet duct 11 at the left to flow therethrough and into the chest at the left while at the same time sub-atmospheric pressure occurs in the chest at the left so that this flow of fluid occurring results in a reduced pressure occurring in the inlet duct at the right so that the inlet valve E at that duct is closed.

The linkage 66 further includes operating levers 90 on the valve shafts 60 and pins 91 on the levers 90 operating in slots 92 in the bar 69. The parts just described are cooperatively coupled by means of the bar 69 so that the valves related to one chest are positioned opposite to the valves related to the other chest.

With the mechanism as provided by the present invention and assuming the motor M to be operated constantly so that air is constantly exhausted from manifold J, one chest or the other will be open to manifold J through the valve K related to the chest while the other chest is open to atmosphere through the valve M related thereto. Assuming, for example, that the control means is positioned as shown in the drawings, the pneumatic system operates to exhaust air from the chest at the left so that a sub-atmospheric pressure prevails in that chest with consequent flow of fluid, for instance, water bearing fish through the line A to the receiver B down through the supply duct 18 past the baffle D through the inlet duct 11 for the chest at the left and finally into the chest at the left. Since there is a sub-atmospheric pressure in the chest at the left, the inlet valve F for that chest is closed and the level of liquid builds up in that chest until the float 65 of the chest is elevated, moving the control bar 69 to the left. This movement of the control bar shifts or reverses the relationship of parts causing the valve M for the chest at the left to be open so that atmospheric pressure is admitted into this chest. At the same time, the chest at the right is connected with the manifold through the valve K for the chest at the right, and the valve M for the chest at the right is closed. As this switching occurs, the inlet valve for the chest at the left closes and that for the chest at the right opens while at the same time the outlet valve for the chest at the right closes and that for the chest at the left opens by reason of gravity acting on the liquid in the chest at the left. Gravity acting on the liquid in the chest at the left causes that chest to empty rapidly and by the time the chest at the right is filled, the chest at the left has emptied and the inlet valve F thereof has returned to a position ready to be closed as soon as a reduced pressure occurs in the chest at the left. Whenever flow is occurring into one of the chests as, for instance, into the chest at the left, the inlet valve E for the chest is readily swung or deflected to a full open position as shown at the left in Fig. 2, and when the flow stops this inlet valve returns by gravity to a position ready to seal as soon as the action reverses.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, two liquid handling chests with upper and lower inlet and outlet openings, an inlet valve pivotally connected to each chest and adapted to control the inlet opening and substantially closed when free, an outlet valve pivotally connected to each chest and adapted to control the outlet opening and substantially closed when free, a flow line adapted to supply liquid to the chests through the inlet openings, pneumatic means including an air pump, and reversible valve means whereby one chest is closed to atmosphere and open to the pump while the other chest is open to atmosphere and closed to the pump, and liquid level actuated control means in each chest whereby the valve means is reversed responsive to liquid level in the chests.

2. In combination, two liquid handling chests with upper and lower inlet and outlet openings, each chest having an inlet valve adapted to control the inlet opening and substantially closed when free, and an outlet valve adapted to control the outlet opening and substantially closed when free, a flow line adapted to supply liquid to the chests through the inlet openings, pneumatic means including an air pump, each chest having an air valve adapted to control flow of air from the chests to the pump and an atmospheric valve adapted to control flow of air from atmosphere to the chests, and control means adapted to govern the air and atmospheric valves whereby the air valve for one chest is open when the other is closed and the atmospheric valve for each chest is open when the air valve therefor is closed.

3. In combination, two liquid handling chests with upper and lower inlet and outlet openings, each chest having a pivoted gravity actuated inlet valve adapted to control the inlet opening and substantially closed when free, and a pivoted gravity actuated outlet valve adapted to control the outlet opening and substantially closed when free, a flow line adapted to supply liquid to the chests through the inlet openings, pneumatic means including an air pump, and reversible valve means whereby one chest is closed to atmosphere and open to the pump while the other chest is open to atmosphere and closed to the pump, and liquid level control means in each chest whereby the valve means is reversed responsive to liquid level in the chests.

4. In combination, two liquid handling chests each with an upper inclined inlet duct projecting therefrom and having a seat opening toward the chest, and a lower inclined outlet duct projecting therefrom and having a seat opening away from the chest, each chest having a pivoted gravity actuated inlet valve adapted to cooperate with the seat of the inlet duct and a pivoted gravity actuated outlet valve adaped to cooperate with the seat of the outlet duct, a flow line adapted to supply liquid to the chests through the inlet ducts, pneumatic means including an air pump, and reversible valve means whereby one chest is closed to atmosphere and open to the pump while the other chest is open to atmosphere and closed to the pump, and liquid level control means whereby the valve means is reversed responsive to liquid level in the chests.

5. In combination, two fluid handling chests, each with an upper inlet opening and a lower outlet opening, an inlet valve adapted to control the inlet opening and substantially closed when free, and an outlet valve adapted to control the outlet opening and substantially closed when free, a flow line adapted to supply fluid to the chests through the inlet openings, pneumatic means including an air pump connected with the chests, and reversible valve means between the pump and the chest whereby one chest is closed to atmosphere and open to the pump while the other chest is open to atmosphere and closed to the pump, and fluid level control means in each chest and related to the valve means whereby the valve means is reversed responsive to fluid level in the chests, each of said inlet and outlet valves having a head, an arm projecting from the head, and means pivotally mounting the arm on a horizontal axis above and spaced from the head whereby the head hangs by gravity in a substantially closed position.

6. In combination, two unitary liquid handling chests, each with an upper inlet opening and a lower outlet opening, an inlet valve adapted to control the inlet opening and substantially closed when free and an outlet valve adapted to control the outlet opening and substantially closed when free, a flow line adapted to supply liquid to the chest through the inlet openings, pneumatic means including an air pump, and reversible valve means whereby one chest is closed to atmosphere and open to the pump while the other chest is open to atmosphere and closed to the pump, and liquid level control means in each chest and connected with the valve means whereby the valve means is reversed responsive to liquid level in the chests and including floats in the chests responsive to the level of liquid in the chests.

7. In combination, two unitary fluid handling chests, each with an upper inlet opening and a lower outlet opening, a pivotal inlet valve adapted to control the inlet opening and substantially closed when free, and a pivotal outlet valve adapted to control the outlet opening and substantially closed when free, a flow line adapted to supply fluid to the chests through the inlet openings, pneumatic means including an air pump, air valves adapted to control flow of air from the chests to the pump, atmospheric valves adapted to control flow of air from atmosphere to the chests, and fluid level actuated control means in each chest connected to the valve means and adapted to govern the air and atmospheric valves whereby one air valve is open when the other is closed and the atmospheric valve for each chest is open when the air valve therefor is closed, and including floats in the chests responsive to the fluid level therein.

8. In combination, two unitary liquid handling chests, each with an upper inlet opening and a lower outlet opening, an inlet valve adapted to control flow through the inlet opening and substantially closed when free, and an outlet valve adapted to control flow through the outlet opening and substantially closed when free, a flow line adapted to supply liquid to the chests through the inlet openings, pneumatic means including an air pump, air valves related to the chests and adapted to control flow of air from the chests to the pump, atmospheric valves related to the chests and adapted to control flow of air from atmosphere to the chests, and liquid actuated control means adapted to govern the air and atmospheric valves whereby one air valve is open when the other is closed and the atmospheric valve for each chest is open when the air valve therefor is closed, the control means including a shiftable actuator, means in each chest responsive to liquid level in the chests and adapted to operate the actuator, and linkage operatively connecting the actuator and the air and atmospheric valves.

9. In combination, two unitary fluid handling chests, each with an upper inlet opening, a lower outlet opening, a pivoted inlet valve adapted to control flow through the inlet opening and substantially closed when free and a pivoted outlet valve adapted to control flow through the outlet opening and substantially closed when free, a flow line adapted to supply fluid to the chests through the inlet openings, pneumatic means including an air pump, air valves in communication with the pump and the chests and adapted to control flow of air from the chests to the pump, atmospheric valves in communication with the chests and adapted to control flow of air from atmosphere to the chests, and control means adapted to govern the air and atmospheric valves whereby one air valve is open when the other is closed and the atmospheric valve for each chest is open when the air valve therefor is closed, the control means including a shiftable actuator, a float in each chest responsive to fluid level in the chests and adapted to operate the actuator, and linkage operatively connecting the float with the actuator and the actuator with the air and atmospheric valves.

10. In combination, two elongate vertically disposed liquid handling chests, each with an upper inlet opening and a lower outlet opening, a pivoted inlet valve adapted to control flow through the inlet opening and substantially closed when free and a pivoted outlet valve adapted to control flow through the outlet opening and substantially closed when free, a flow line adapted to supply liquid to the chests through the inlet openings thereof, pneumatic means including an air pump, an air valve connected with each chest on the pump and adapted to control flow of air from the chest to the pump, an atmospheric valve connected to each chest and adapted to control flow of air from atmosphere to the chest, and control means adapted to govern the air and atmospheric valves of each chest whereby one air valve is open when the other is closed and whereby the atmospheric valve for each chest is open when the air valve therefor is closed, the control means including, a liquid level responsive float in each chest, an actuator mounted to reciprocate, levers operatively connecting the floats and said actuator, and levers operatively connecting the actuator and the air and atmospheric valves.

11. In combination, two liquid handling chests each with an upper inclined inlet duct projecting therefrom and having a seat opening toward the chest, and a lower inclined outlet duct projecting therefrom and having a seat opening away from the chest, a pivoted inlet valve carried by each inlet duct and adapted to cooperate with the seat thereof, a pivoted outlet valve carried by each outlet duct and adapted to cooperate with the seat thereof, a supply duct connecting and adapted to supply liquid to the inlet ducts, a flow line adapted to supply liquid to the chests through the supply duct, a deflector located where the inlet ducts connect with the supply duct and adapted to direct flow of liquid from the supply duct to one or the other of the inlet ducts, pneumatic means including an air pump, and reversible valve means whereby one chest is closed to atmosphere and open to the pump while the other chest is open to atmosphere and closed to the pump, and liquid level actuated control means whereby the valve means is reversed responsive to liquid level in the chests, the control means including a shiftable actuator, float means in each chest responsive to liquid level in the chests and adapted to operate the actuator and means operatively connecting the actuator and the said valve means and the deflector.

References Cited in the file of this patent

UNITED STATES PATENTS

| | | |
|---|---|---|
| 268,305 | Smith | Nov. 28, 1882 |
| 287,033 | Lewis | Oct. 23, 1883 |
| 1,908,220 | Chapman | May 9, 1933 |
| 2,221,741 | Vogel-Jorgensen | Nov. 12, 1940 |